March 26, 1968 B. I. BERTELSEN 3,375,503

MAGNETOSTATICALLY COUPLED MAGNETIC THIN FILM DEVICES

Filed Sept. 13, 1963

INVENTOR
BRUCE I. BERTELSEN

BY Bertram M. Mullin

ATTORNEY

United States Patent Office 3,375,503
Patented Mar. 26, 1968

3,375,503

MAGNETOSTATICALLY COUPLED MAGNETIC THIN FILM DEVICES

Bruce I. Bertelsen, Poughkeepsie, N.Y., assignor to International Business Machines Corporation, New York, N.Y., a corporation of New York Filed Sept. 13, 1963, Ser. No. 308,868
3 Claims. (Cl. 340—174)

ABSTRACT OF THE DISCLOSURE

A multi-layer magnetic thin film device is provided exhibiting essentially closed flux path characteristics. Such a device has at least two separate magnetic layers, one of which has sloping sections, adjacent to a section parallel to the other film, which tends to approach and touch the other film such as to minimize the gap between films.

This invention refers to thin film magnetic devices, and, in particular, to thin film magnetic devices utilizing magnetostatically coupled thin films for the storage of digital intelligence.

Thin magnetic films for memory applications have been widely discussed in the literature. These films are characterized by a magnetically induced uniaxial axis of anisotropy—easy axis—in the plane of the film. The uniaxial axis of anisotropy is established typically by use of an orienting magnetic field during the formation process such as in vacuum deposition or electrodeposition. These films are further characterized in that they exhibit a rectangular hysteresis loop along the easy axis and a nearly closed loop along the hard axis, which is orthogonal to the easy axis. Opposite states of remanent flux orientation are defined along the easy axis of magnetization, and, switching from one state to the other is accomplished with the proper combination of transverse and longitudinal fields.

As storage cells for a memory matrix, each magnetic thin film is inductively coupled to two drive lines to form a bit. One of these lines is transverse to the easy axis while the other is parallel to it. In practice, it is customary to refer to the transverse drive line as the word line, and, to the parallel drive line as the bit drive line. Magnetic switching is accomplished by applying selected combinations of current in proper time coincidence on both drive lines. A given bit is interrogated by supplying the drive field in the hard direction and by having a sense line available to detect the voltage associated with any magnetization change. The two states of magnetization are accordingly referred to as 1's or 0's and the total information contained in the matrix of magnetic bits is represented by the pattern of such signals.

These memory matrices are generally constructed from either flat film or cylindrical film elements. The former, the flat film elements, are the easiest to fabricate and accommodate drive and sense strip lines most readily. However, the demagnetizing fields about the small bits aggravate dispersion and creeping, and result in highly restrictive limits for the bit current. The latter, the cylindrical film element, although providing a closed flux path, a decided advantage over the flat film configuration, produces high impedance in the drive lines, a most undesirable condition for memory matrix operation. Along with this, the drive field is not well-confined to the bit area underneath the drive wire, thereby requiring rather large spacings between adjacent bits in order to avoid loss in information by stray fields from neighboring drive lines.

The heretofore mentioned phenomena of dispersion and creep are the two major factors which adversely effect the operation of the memory elements. Dispersion comes about from the local variation of anisotropy constant and the variation of easy direction of magnetization in the films. In a high dispersion film, large fields are required in order to retain the single domain switching characteristics, which in turn places greater demands upon the bit drive. This increases creep susceptibility. Creep is experienced as a result of a series of pulsed disturb fields, each of which is below the single pulse switching threshold for the thin film. Physically it is observed to arise from the movement of domain walls bounding a bit or from the growth of a reversed edge domain. Sources of disturb fields include the bit field, the fringe field due to the neighboring word drive, the leakage current in the word line, the self-demagnetizing field and the stray field due to neighboring bits.

From theoretical and analytical considerations it was thought that these adverse phenomena would be overcome with a memory element that achieves both the closed flux path of the cylindrical film and the straight, flat strip line array of the flat film. The approach taken has been to couple magnetic films to form a closed flux path. Two films on separate substrates have been positioned one over the other with drive and sense strip lines interposed between the films. Such structures have not eliminated the edge domains, which are the nuclei for flux reversal by creep.

Furthermore, in addition to the edge domain difficulties, the strip lines interposed between the films, which are compatible to these prior structures, sustain high power dissipation and signal attenuation due to high line impedance. The large distance between the line and ground return is a major source of difficulty in these prior multi-paired film structures. Accordingly, it has been an object considerable research, therefore, to find a memory element which is not adversely affected by creep, power dissipation, and dispersion.

It is a prime object of this invention to provide an improved thin film magnetic element for application in a memory matrix.

Another object of this invention is to provide an improved thin film closed flux path type of element capable of high packing densities, high speeds, and creep-free operation in the conventional orthogonal mode.

Still another object of this invention is to provide an improved thin film magnetic memory device utilizing magnetostatically coupled thin films.

The foregoing and other objects, features and advantages of the invention will be apparent from the following more particular description of preferred embodiments of the invention as illustrated in the accompanying drawings.

It has been found that magnetostatically coupled thin films superimposed one over the other, with their easy axis aligned, overcome the effects of creep and dispersion. In such an element, a relatively thick conductor is interposed between the magnetostatically coupled films and a second conductor is superimposed over the films in quadrature to the relatively thick conductor. The two films experience exactly opposite fields of the same strength from the interposed drive. In the absence of a field the magnetization vectors line up with the easy axis of the films to reduce the anisotropy energy; due to the coupling field, the magnetization vectors tend to assume antiparallel positions. Any applied field from the interposed line also drives the magnetization vectors antiparallel. What occurs is that the magnetostatically coupled films with their easy axes aligned behave exactly as a single film. The coupled films form a closed magnetic structure with no external field.

With the closed flux path, and the resulting reduction in demagnetizing fields, single domain switching operation is available with relatively thick films in comparison to the magnetic films of single film devices, easing the sensing problem, since greater amount of flux is available. Also, since reverse domains are less likely to form at edges and the demagnetization in the closed device approaches zero, the disturb sensitivity problem is reduced. Over-all the coupled film structure lends itself to high packing densities, high speeds and creep-free operation in a conventional orthogonal mode of operation.

Figures 1, 2, 3, 4:
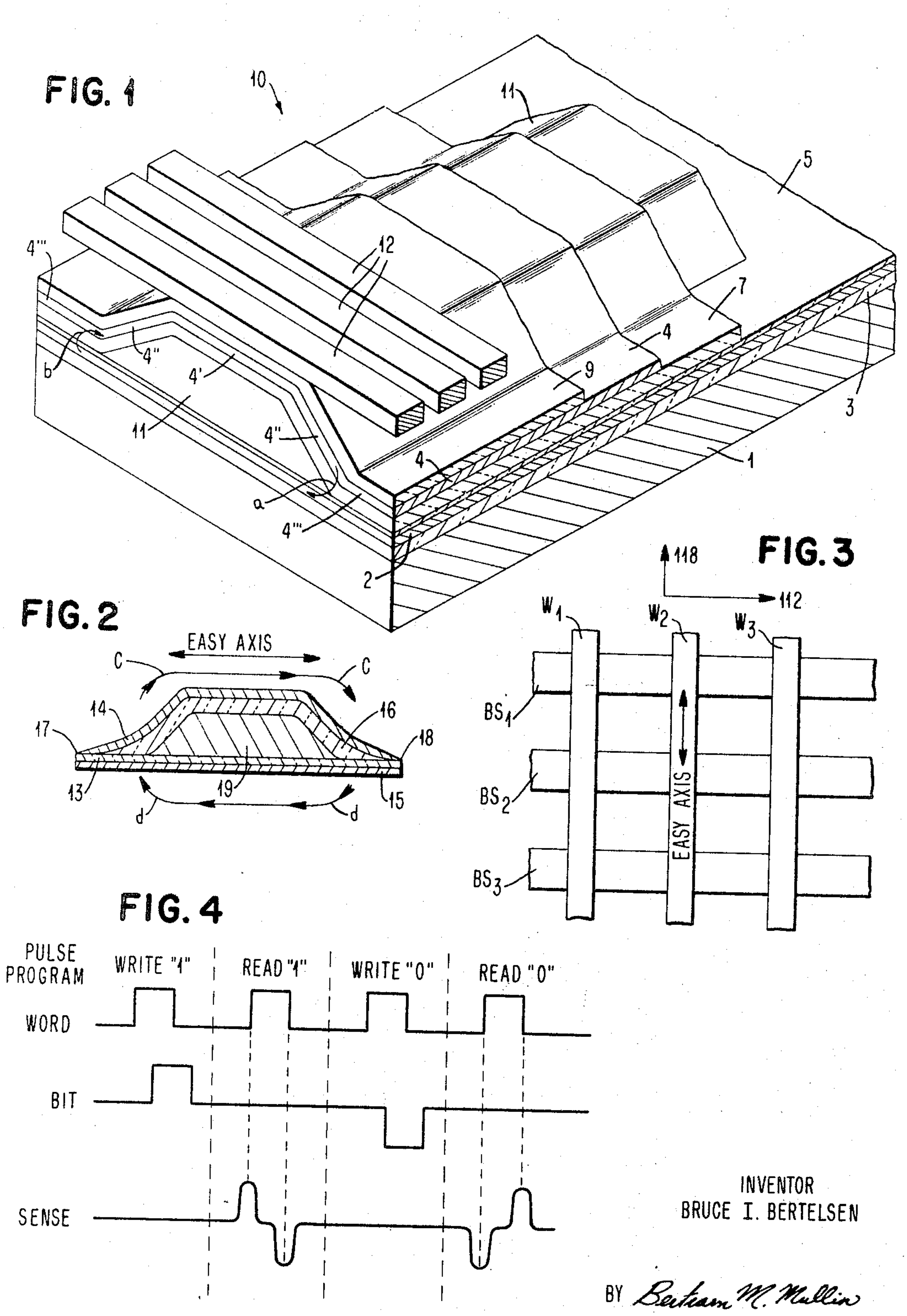
FIGURE 1 is a schematic illustration of one embodiment of the magnetic element of this invention.
FIGURE 2 is a cross-sectional view of the magnetostatically coupled films of another embodiment of the invention.
FIGURE 3 is a schematic illustration of a memory matrix employing the magnetic element illustrated in FIGURES 1 and 2 above.
FIGURE 4 is a representation of the pulse program for operation of the magnetic element as set forth in FIGURE 3.

Referring now to FIGURE 1 of the drawings, there is shown magnetic element 10 which includes a pair of magnetostatically coupled thin films 2 and 4 which are superimposed over conductive substrate 1 such that the easy axis of the coupled films are aligned parallel one to the other. Each of the magnetic films 2 and 4 is sandwiched between two layers of insulative material 3 and 5, and, 7 and 9, respectively. The insulation is a material such as silicon monoxide or glass, with the silicon monoxide being preferred. Besides serving as insulation, the silicon monoxide improves reproducibility and is effective in reducing variations of substrate surface roughness. With it, control is provided over the coercivity of the film, furnishing identical switching characters in the magnetostatically coupled films.

In forming magnetic memory element 10, substrate 1 is first polished to a high surface finish before it is coated with the insulated material such as silicon monoxide layer 3. The thickness of layer 3, which is deposited over the substrate surface, is between 1 to 4 microns.

Where extremely high adhesion is desired between the substrate and insulative material, such as in those instances where discontinuous fabrication steps are used, a chromium or aluminum layer is vacuum deposited over the substrate. The metal layer serves to increase the adhesion forces that hold the insulative material onto the substrate. With reference to FIGURE 1 the chromium or aluminum layer (not shown) is interposed between substrate 1 and layer 3. The metal layer may be used wherever adhesion is a problem between layers.

In forming the various layers on the substrate, heat is applied at a temperature varying between 250° C. to 350° C. This tends to drive gases from the substrate and provides an anneal which generally results in better control over the anisotropy characters of the magnetic films.

Magnetic film 2, having a composition of about 80% nickel and 20% iron, is superimposed over silicon monoxide layer 3. Magnetic film 2 is continuous and is grown to a thickness from 500 to 5000 A. While magnetic film 2 is being condensed, a field is applied which is parallel to the direction of the desired easy axis. The field strength that is applied varies between 25 to 75 oersteds during the deposition process.

Magnetic film 2 is then coated with silicon monoxide layer 5 thereby completing the first sandwiching of magnetic film 2. Silicon monoxide layer 5, as the layer 3, is continuous and is deposited to a thickness of about 1 micron for insulation.

Conductive layer 11 is vapor deposited through a mask that permits the conductive material, which may be copper, silver or aluminum, to assume what approaches a trapezoidal configuration in cross-section. The thickness of layer 11 may vary from 1 to 10 microns depending on the resistivity of the material, the density of the elements required, and the tolerable resistive loss in the line. Conductive layer 11 serves two functions: it is both a bit drive and sense line, that is, the bit field is applied along the line and the induced voltage resulting from a change in the magnetization state of the films is sensed by way of the line.

Over conductive layer 11 silicon monoxide layer 7 is superimposed to a thickness varying between 1 to 4 microns. Layer 7 may be masked or not, depending on the degree of magnetic coupling required.

The second magnetic film 4, which is positioned over silicon monoxide layer 7, is condensed in the presence of a field which is applied to induce the easy axis of film 4 to assume a position parallel to the easy axis of film 2. As film 4 condenses on film 7 it tends to assume the trapezoidal configuration of silicon monoxide layer 7.

As shown in FIGURE 1, magnetic film 4 has a center planar section 4' parallel to planar magnetic film 2, and, has side sections 4'', that slope or are arcuated, and enclose the sides of conductive layer 11. In cross-sectional view, magnetic film 4 assumes a trapezoidal configuration. Magnetic flux tends to flow from film 4 to film 2 about center section 4' through sloping or arcuated sections 4'', jumping from sloping sections 4'' as shown by arrows *a* and *b* to film 2. End sections 4''' of magnetic film 4 are not required to complete the magnetic coupling as is brought out in the discussion of embodiment 2 below.

If desired, in forming magnetic film 4, masking or etching techniques are available to form stripes having their long axis parallel to the film easy axis. However it is believed unnecessary to decouple bits at all since the hard direction drive fields are well-defined in this element.

Silicon monoxide layer 9 is then positioned over magnetic film 4 to complete the sandwiching of film 4. Over the layer 9 a second set of conductive lines 12 are vacuum deposited through a mask to form an array of word lines. Conductive lines 12 are deposited orthogonal to the conductive layer 11. Alternatively, the word lines may be photo-etched in a standard printed circuits material and the photo-resist that remains used as an insulator in place of the silicon monoxide layer 9.

A cross-sectional view of magnetostatically coupled films 13 and 14 of another embodiment of the invention is shown in FIGURE 2. There, magnetic films 13 and 14 are in contact at 17 and 18 to form a completely closed flux path. To form the device in this manner, the first silicon monoxide layer 15 is formed as in FIGURE 1, while, the silicon monoxide layer 16 deposited about conductive material 19, is deposited through a mask such that it does not have flat planar end portions. In this manner, magnetic layer 14 when superimposed over silicon monoxide layer 16 touches magnetic layer 13. A closed flux path is formed as illustrated by arrows *c* and *d* of FIGURE 2.

The memory elements of FIGURES 1 and 2 may form part of a memory matrix such as shown in FIGURE 3. As illustrated, the magnetic elements are arranged in rows and columns with the associated conductors, that is, the word lines $W_1$–$W_2$ and the common-bit-sense lines $BS_1$–$BS_3$ being disposed in such a manner that the conductors are substantially perpendicular to each other. The memory matrix shown in FIGURE 3 is word organized with the word lines supplying the field in a transverse direction sufficient to rotate the magnetization 90° from the easy axis. With vector 118 indicating the remanent magnetization along the easy axis, a field applied along the word line will cause the magnetization vector to rotate to the direction of vector 112. A current pulse of either polarity on the bit line conductor supplies a field along the easy axis which will cause the magnetization vector to fall to the 1 or 0 direction upon the termination of the transverse pulse. Readout occurs on the rise of a transverse pulse. The bit pulse starts after the start of and ends after the completion of the transverse pulse.

Referring to FIGURE 4, a pulse program for the energization of the different word and bit lines is shown for the operation of the memory matrix of FIGURE 3. To store a "1" for example, along word line $W_2$, a pulse program such as indicated under caption Write 1 of FIGURE 4 is applied. First, a word pulse of positive polarity is applied along the $W_2$ drive line which drives all bits along that line into the hard direction. If information were previously stored along the line, a sense amplifier (not shown) at the end of the bit-sense line would detect the original state of magnetization of the bits by the sign of the induced voltage. The sense signals detected are summarized in FIGURE 4. Referring back to the writing of a "1," before the current pulse in the $W_2$ drive line is terminated, a positive bit pulse is applied along the selected bit-sense drive line. Once the bit current is on, the current in the word drive line $W_2$ is discontinued. This causes the magnetization vector to rotate to the right and store a 1. To store a 0, as indicated under the caption Read 0 of the pulse program, a positive pulse is first applied along the $W_2$ as in the storage of 1. However, for the storage of the 0, the polarity of the pulse along the bit drive line is opposite to that of the polarity of the pulse of the storage of the 1. The requirements of the bit pulses are that they be large enough to assure complete rotation either to the right or left but small enough not to disturb bits on other word lines. The word pulse program merely requires that its field be large enough to drive all bits into the hard direction. In principal, there is no upper limit to its magnitude.

With the memory element of the invention, domain wall creeping is impeded. There are two factors which contribute to this result. Firstly, stray fields external to the structure, usually in the hard direction, see an open structure thick film of narrow width. Consequently, the shape anisotropy, which is usually negligible in single films, aids in holding the magnetization in the chosen storage state. Secondly, the closed flux path in the easy direction practically eliminates edge domains. Thus for disturb currents through the conductors to reverse flux, either domain walls at the open edges must be moved, or nuclei of reversed flux must be formed first.

What has been described in a magnetic element utilizing magnetostatically coupled films to provide large signals, high packing densities, low drive current requirements and enabling a relaxation of material requirements. The magneto-statically coupled films provide an essentially closed flux path memory element enabling higher switching speeds to be achieved since the film flux no longer returns through a ground plane as in prior structures. Increased signal obtainable with the element greatly improves the signal to noise ratio and eases sense amplifier design requirements. Elements of the type find application as memory and switching devices.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A storage element comprising:

a pair of magnetostatically coupled thin films, each exhibiting an easy axis of magnetization defining opposite states of remanent flux orientation, said first of said films being planar and continuous and superimposed over a substrate, said second of said films having a raised planar section extending lengthwise along the center of said film parallel to said first film with side sections sloping toward and forming a flux conductive joint with said first film, and each of said films having its easy axis in parallel alignment with the other and extending across said films orthogonal to said raised planar section, a first means, including a conductor, inductively coupled to said films, interposed between said films under said raised portions of said second film, such that the sloping side sections of said second magnetic film encloses said conductor; and a second means, including a conductor, inductively coupled to said films, superimposed over said second film in quadrature with the conductor of said first means.

2. A storage element comprising:

a pair of magnetostatically coupled thin films, each of which is sandwiched between two layers of insulation respectively, and each of which exhibits an easy axis of magnetization defining opposite states of remanent flux orientation, said first of said films being planar and continuous and said second of said films having a raised planar section extending lengthwise along the center of said films parallel to said first film with side sections sloping toward and forming a flux conductive joint with said first film, and each of said films having its easy axis in parallel alignment with the other and extending across said films orthogonal to said raised planar section;

a first means, including a conductor, inductively coupled to said films, interposed between said films under said raised portion of said second film such that said sloping side portions of said second magnetic film enclose said conductor; and a second means, including a conductor, inductively coupled to said films, superimposed over said second film and in quadrature with the conductor of said first means.

3. An apparatus for storing digital intelligence on a pair of magnetostatically coupled thin magnetic films, each of which exhibits an easy axis of magnetization defining opposite states of remanent flux orientation comprising:

a substrate;

a silicon monoxide layer superimposed over said substrate;

a planar magnetic film superimposed over said silicon monoxide layer and having its easy axis in the plane of said films;

a second silicon monoxide layer superimposed over said first magnetic film;

a first means, including a conductor, superimposed about and extending along the center portion of said second silicon monoxide layer;

a third silicon monoxide layer superimposed over said conductor;

a second magnetic film superimposed over said third silicon monoxide layer with its easy axis in parallel alignment with said easy axis of said first film and said easy axis extending at right angles to said conductor, said second magnetic film having a raised planar section extending lengthwise along the center of said third silicon monoxide layer parallel to said first magnetic film and side sections sloping towards said second silicon monoxide layer and forming a joint with said second silicon monoxide layer on both sides of said first conductor;

a fourth silicon monoxide layer superimposed over said second magnetic film; and a second means, including a conductor, superimposed over said fourth silicon monoxide layer and in quadrature with said first conductor.

References Cited

UNITED STATES PATENTS

| | | | |
|---|---|---|---|
| 3,125,745 | 3/1964 | Oakland | 340—174 |
| 3,270,327 | 8/1966 | Davis | 340—174 |
| 3,276,000 | 9/1966 | Davis | 340—174 |

TERRELL W. FEARS, *Primary Examiner.*

JAMES W. MOFFITT, BERNARD KONICK, *Examiners.*

R. MORGANSTERN, *Assistant Examiner.*